(12) United States Patent
Kunkel

(10) Patent No.: US 10,641,076 B2
(45) Date of Patent: May 5, 2020

(54) SLUG CATCHER SKID

(71) Applicant: Thomas Kunkel, Cranberry Township, PA (US)

(72) Inventor: Thomas Kunkel, Cranberry Township, PA (US)

(*) Notice: Subject to any disclaimer, the term of this patent is extended or adjusted under 35 U.S.C. 154(b) by 0 days.

(21) Appl. No.: 16/351,800

(22) Filed: Mar. 13, 2019

(65) Prior Publication Data

US 2019/0211663 A1 Jul. 11, 2019

Related U.S. Application Data

(63) Continuation-in-part of application No. 15/626,737, filed on Jun. 19, 2017, now Pat. No. 10,274,133.

(60) Provisional application No. 62/356,168, filed on Jun. 29, 2016.

(51) Int. Cl.
*E21B 43/34* (2006.01)
*F25J 1/00* (2006.01)
*B01D 17/00* (2006.01)
*B01D 19/00* (2006.01)

(52) U.S. Cl.
CPC ............. *E21B 43/34* (2013.01); *B01D 17/00* (2013.01); *B01D 19/0063* (2013.01); *F25J 1/0022* (2013.01)

(58) Field of Classification Search
CPC ..... E21B 43/34; B01D 17/00; B01D 19/0063; F25J 1/0022
See application file for complete search history.

(56) References Cited

U.S. PATENT DOCUMENTS

| | | | | |
|---|---|---|---|---|
| 2,328,178 A * | 8/1943 | Teter | ...................... | C10G 11/18 208/153 |
| 6,315,048 B1 * | 11/2001 | Etzkorn | ................ | E21B 43/121 166/267 |
| 6,820,689 B2 * | 11/2004 | Sarada | ................ | E21B 41/0057 166/244.1 |
| 8,585,804 B2 * | 11/2013 | Amidei | ..................... | F02C 3/22 95/117 |
| 8,870,991 B2 * | 10/2014 | Burns | ................ | B01D 46/0024 55/410 |
| 10,519,983 B1 * | 12/2019 | Ellis, Jr. | .................. | E21B 34/06 |

(Continued)

*Primary Examiner* — James G Sayre
*Assistant Examiner* — Aaron L Lembo
(74) *Attorney, Agent, or Firm* — Kathleen Kuznicki; The Lynch Law Group, LLC

(57) ABSTRACT

Disclosed is a slug catcher skid that is comprised of an integral inlet separator sized for a single compressor flow and each slug catcher skid is only used with a single compressor. The flow through the integral inlet separator is determined by the flow rate through the single compressor to which it is attached. Additionally, the other piping on an individual slug catcher skid such as the common gas inlet pipe headers, the common liquid drain pipe headers, and the common gas discharge pipe headers are sized for the flow of multiple compressors in a single facility. Some embodiments of the slug catcher skid are further comprised of an inlet filter separator, a Positive Shut Off (PSO) system, and/or an equalizing system in various combinations. The slug skids of the claimed invention may be further comprised of post compressor functional equipment including but not limited to a discharge gas oil separation vessel and a glycol separation vessel.

11 Claims, 4 Drawing Sheets

(56) References Cited

U.S. PATENT DOCUMENTS

| | | | | |
|---|---|---|---|---|
| 2004/0011523 A1* | 1/2004 | Sarada | ............... | E21B 41/0057 |
| | | | | 166/244.1 |
| 2010/0054966 A1* | 3/2010 | Rogers | ................... | F04B 47/02 |
| | | | | 417/362 |
| 2010/0065279 A1* | 3/2010 | Conner | ................ | E21B 43/006 |
| | | | | 166/372 |
| 2011/0268586 A1* | 11/2011 | Rogers | ................... | F04B 47/02 |
| | | | | 417/53 |
| 2015/0083411 A1* | 3/2015 | Oborn | ....................... | C02F 1/20 |
| | | | | 166/266 |
| 2015/0368566 A1* | 12/2015 | Young | .................. | H04W 76/10 |
| | | | | 700/273 |
| 2017/0145918 A1* | 5/2017 | Oehring | ................... | F02C 7/05 |

\* cited by examiner

SLUG CATCHER SKID

This non-provisional patent application claims priority to non-provisional application U.S. Ser. No. 15/626,737 filed on Jun. 19, 2017 which in turn claims priority to provisional patent application Ser. No. 62/356,168 filed on Jun. 29, 2016, both disclosures are fully incorporated into this application.

BACKGROUND

Natural gas gathering compressor facilities built using traditional methods use separate pieces of equipment connected with lengths of pipe which must all be sized for anticipated station growth. The growth plans change often, affected by the dynamic nature of drilling plans, differing well production flows, and unknown longevity/decrease of flows from different wells. Using an optimistic approach, a station will be built with oversized pipe and equipment anticipating a target growth size. Until that size is reached, the extra cost of the larger initial infrastructure burdens the economics for the site. If a station outgrows its target size, then the current infrastructure must be re-built to handle the added site capacity—an expensive and often fatal economic blow to the expansion plans.

Traditional compressor facility designs are progressing into a mode where equipment modularization is perceived as a cost saving design and construction advantage. Previous modularization efforts, however, simply mimic the usual approach of using separate pieces of equipment connected with separate utility and process piping systems. This usually results in a large site with extensive site civil works, with lengthy and expensive construction schedules.

A compressor station is a facility which helps the transportation process of natural gas from one location to another. A gathering compressor station is used as a centralized location where several wells in an area send their flows. Though natural gas is considered "dry" as it passes through a pipeline, the raw gas from the wells is saturated with liquids in the form of hydrocarbons or water. This liquid condenses in the pipes leading to the compressor station and eventually flows into the station from planned pigging operations or as unplanned slugs of free liquids. Compressor stations typically include equipment such as slug catcher vessels, scrubbers, strainers or filter separators which remove liquids, dirt, particles, and other impurities from the natural gas; each piece of equipment has its own specific function that is distinguishable from the other pieces of equipment. The removed impurities from the gas are disposed as waste or sold if possible.

Previous Inlet Slug Catcher systems work by routing all incoming gas and liquid through a large steel vessel where the gas slows down enough for any liquids to fall to the bottom of the vessel. Additional mechanical methods such as demisters or vane packs are sometimes employed in the vessels to assist with liquid separation. Since the vessel size is limited by shipping dimensions (and weight), additional liquid storage space is often added; these storage spaces are commonly referred to as "finger skids". From the temporary storage in the vessel and finger skids, the liquid is slowly drained into liquid pipes, known as liquid "headers", that run throughout the facility. These pipe systems carry the gathered liquids to on-site storage tanks or processing systems. The liquid-free gas is then routed to the compressor suction via piping systems known as gas "headers".

The inlet to a compressor station must be designed to the possible future size of the facility since it is generally intended to be a gas receipt point from multiple wells over a number of years. This process is always filled with compromise since the general industry mindset is to "build it once", but with increasing size comes higher initial cost. Sizing the inlet system is usually a problematic issue. When sizing a gathering facility's inlet system, the Engineer needs to evaluate possible gas pressures and flow rates that could occur over time. The evaluation starts with identifying the possible mix of liquids and gases that comes up from a gas well. Usually the Producer (well owner) installs a steel vessel (free liquid separator) at the well location to separate the free liquid from the gas. If this equipment malfunctions or is not properly operated, some or all these free liquids can be sent with the gas to the compressor station. Even when well pad separation equipment is properly operated, the gas leaving the well pad is still saturated with liquids (analogous to a "fog"). The gas cools as it runs through underground piping to a compressor facility. When the "fog" cools it condenses, or "rains", inside the pipe. To keep the pipe from filling with condensate over time, the pipeline Operators will run a "pig" (analogous to a rubber "squeegee") through the line to push the liquids out of the pipe. This liquid ends up coming into the compressor station as a "slug" of liquid. Depending on the gas composition, frequency of the pigging, terrain "ups and downs", the amount of gas flowing through the line, distance from the wells, and ambient conditions, the liquid volumes can vary. There are always unknown variables that can affect the amount of liquids coming into a station. One of the biggest unknowns is how much gas will end up flowing to the proposed station since higher gas flows carry more saturated liquids which in turn increase the condensate volumes. All these factors make the "one-time" initial sizing of compressor station inlet separation steel vessel (Slug Catcher) equipment a frustrating challenge.

Optionally, an inlet filter separator vessel could be used as part of the inlet system. If used, this piece of equipment is installed downstream of the Slug Catcher to trap any airborne solid particulates and aerosol liquids carried with the gas stream. The inlet filter separator generally has an internal impingement area to remove aerosol liquids from the inlet gas stream and a removable media filter to trap airborne solid particulates.

After traversing the inlet system, liquid-free gas then goes through a series of piping systems to the compressors. All these main artery lines throughout the facility are sized for a maximum flow at a given pressure. As previously mentioned, this sizing for future flow conditions is part educated guesswork tempered with an analysis balancing costs with the risk of under or oversizing the infrastructure. Once the gas lines reach the compressors, a branch line is routed to each machine. In the industry, compressors of different sizes and flow rate capacity are used, and even within an individual facility can differ, and each compressor size requires more or less flow, and the piping systems to and from each machine must be sized to the specific operating conditions for each machine.

The traditional, previously described inlet systems are typically designed to perform their functions for the entire compressor facility where there are multiple compressors. This leads to several common problems. For example, the inlet system must be designed to feed several compressors. However, due to the changing nature of natural gas drilling and production, it is unusual that all the compressors planned for any site are needed and installed with the initial facility build. Therefore, the installed size (or capacity) of an inlet system rarely matches the installed compression needs at any given site. Oversizing the infrastructure for planned expansion results in extra costs for the initial station build. The penalty for under-sizing the same infrastructure could be that future expansion needs are prohibitively expensive.

SUMMARY OF THE INVENTION

Disclosed is a slug catcher skid assembly with an integral inlet separator designed for using gravity to separate the gas from the condensate of a well flow. The slug catcher skid is intended to be used with one of the individual gas compressors located in a facility. Each skid platform assembly also includes a common gas inlet pipe header, a common liquid drain pipe header, and a common gas discharge pipe header. The integral inlet separator as well as the gas inlet pipe, the compressor inlet pipe and the compressor discharge pipe are sized specifically for its matched compressor's flow rate. Whereas, the common gas inlet pipe header, the common liquid drain pipe header, and the common gas discharge pipe header on each slug catcher skid are sized for the flow of multiple compressors in a facility. When multiple skids are installed in series the common inlet pipe headers, the common drain pipe headers, and the discharge pipe headers are used to connect the skids together. The common gas inlet pipe headers, the common drain pipe headers, and the common gas discharge pipe headers connected in series function as the facility's inlet pipe header, liquid drain pipe header, and gas discharge pipe header. Because each skid design includes its own integrated inlet separator (slug catcher), the liquid handling capacity of the facility grows proportionally with the number of skids installed. The integral inlet separator may be comprised of either a large diameter pipe segment or pressure vessel that is designed to achieve liquid separation. The integrated inlet separator is installed near grade elevation. Flow into the integral inlet separator design is restricted to the compressor flow rate. This design feature balances flow into each skid's integral inlet separator and allows for proper sizing of each skid system.

Some advantages of the slug catcher skid design:
Each slug catcher skid platform assembly has an integral inlet separator dedicated to one compressor. In previous designs, at a minimum, the inlet separator (slug catcher) is a single vessel which is sized for the anticipated flow capacity the entire, fully-developed facility servicing multiple compressors and is installed as a standalone piece of equipment connected via facility-sized pipe headers and facility header-sized isolation valves (for maintenance) to other equipment at the site.

The design eliminates sizing guesswork for expanding or shrinking facility needs. Having an integral inlet separator sized appropriately for an individual compressor on a slug catcher skid that is used only with that single individual compressor allows the facility inlet separator capacity to grow in proportion to the number of skids (and compressors) added to a facility. When more compressors are needed then one skid per compressor is added. By adding multiple skids in series, the facility inlet separator capacity grows. The amount of liquid slug volume handled by a series of individual skids bolted together and working as a single system is multiplied by each added skid.

Facility costs using the skid in this disclosure are lower than traditional design/construction methods.

There is a marked cost advantage by using this design for multi-compressor sites since cost for future expansion is spent only when the additional compressor is added instead of spending for all possible future expansion needs with the initial site build.

SHORT DESCRIPTION OF THE FIGURES

DETAILED DESCRIPTION

All embodiments of the slug catcher skid comprise an integral inlet separator sized for a single compressor flow and each slug catcher skid is only used with a single compressor. The flow through the integral inlet separator (and consequently the gas inlet pipe, the compressor inlet pipe, and compressor discharge pipe) is determined by the flow rate through the single compressor to which it is attached. Additionally, the other piping on an individual slug catcher skid such as the common gas inlet pipe headers, the common liquid drain pipe headers, and the common gas discharge pipe headers are sized for the flow of multiple compressors in a single facility. Some embodiments of the slug catcher skid are further comprised of an inlet filter separator which uses a generic filter element to remove solid particulates and an impingement surface to remove aerosol liquids, in addition to the integral inlet separator which uses gravity to separate the gas from the condensate in a well flow. In some embodiments, a Positive Shut Off (PSO) system is used to isolate and protect the compressor when the condensate level gets too high and liquid could possibly enter the compressor, as in for example, during an "upset" operating condition such as when the facility is overwhelmed by an unexpectedly large slug of liquid. The claimed invention discloses slug catcher skids with various configurations of pre-compressor functional equipment through which a well flow, which a mixture of gas and liquid condensate, flows through separating the gas from the liquid condensate before the gas flows through a compressor. The slug skids of the claimed invention may be further comprised of post compressor functional equipment including but not limited to a discharge gas oil separation vessel and a glycol separation vessel.

Figure 1:
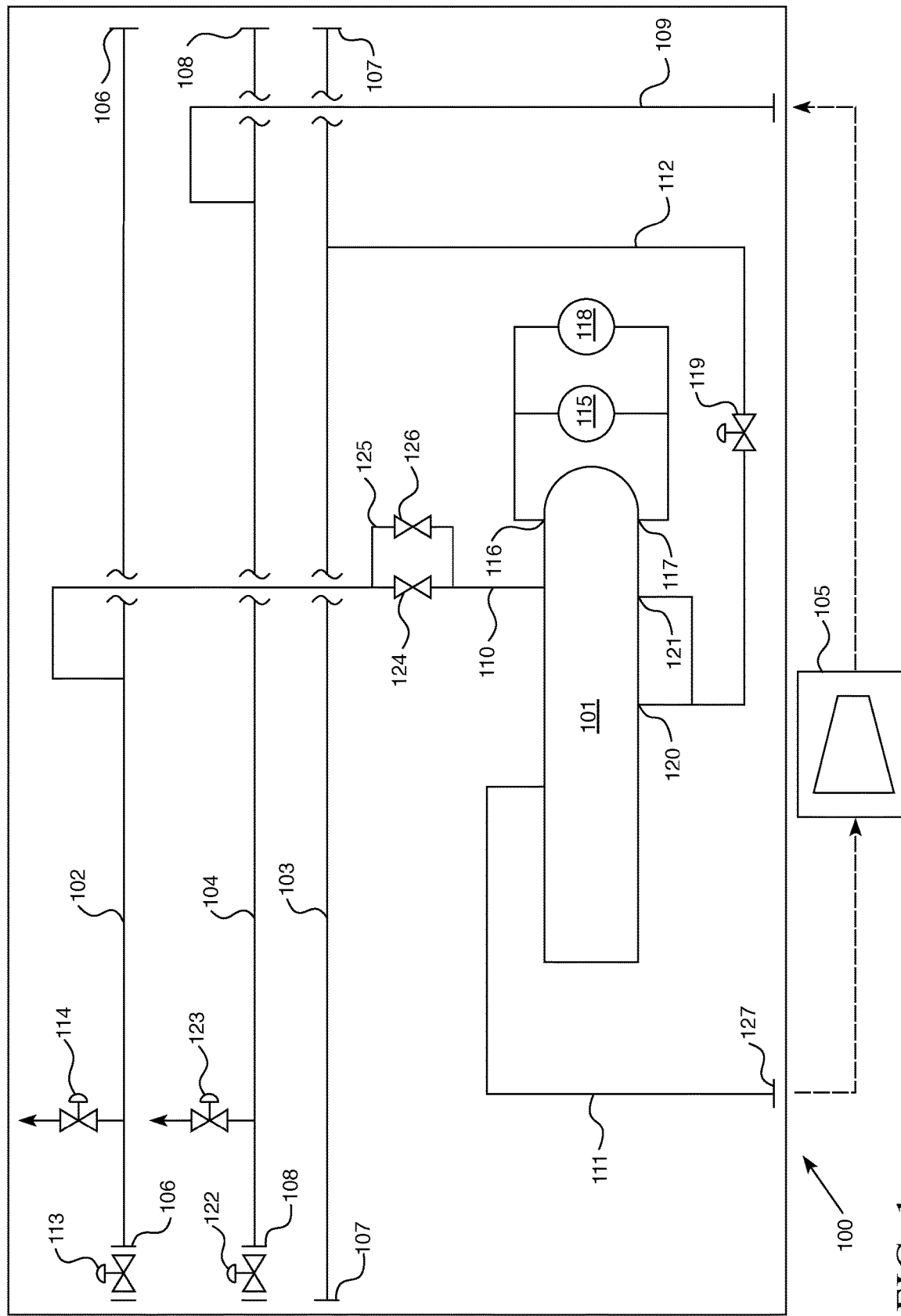
FIG. 1 is a schematic view depicting one embodiment of the slug catcher skid.

FIG. 1 shows one embodiment of slug catcher skid 100. This platform is comprised of an integral inlet separator 101 (slug catcher), a common gas inlet pipe header 102, a common liquid drain pipe header 103 and a common gas discharge pipe header 104. An individual slug catcher skid 100 matches up with one compressor 105 in a multi-compressor facility. As each individual slug catcher skid 100 also has a common gas inlet pipe header 102 with flanged connections 106, a common liquid drain pipe header 103 with flanged connections 107, and a common gas discharge pipe header 104 with flanged connections 108; these pipes function as the compressor facility's inlet pipe, liquid drain pipe, and discharge pipe, respectively, as the individual slug catcher skids 100 are connected in a series to one another. On each individual slug catcher skid 100, the integral inlet separator 101 (slug catcher) is sized so that the gas from a well flow is separated out, according to the specification of its matched compressor 105.

The pathway of the well flow is outlined as follows. All well flow to the slug catcher individual slug catcher skid 100 enters through a common gas inlet pipe header 102 and the well flow proceeds through the gas inlet pipe 110 to the integral inlet separator 101, where the gas is separated from the condensate of the well flow. In this embodiment, the separated gas then flows from the integral inlet separator 101 directly into the compressor 105 via the compressor inlet pipe 111 through the skid-to-compressor connection 127. When multiple skids are installed in series, the well flow continues down all the connected common gas inlet pipe headers 102. Compressor discharge gas flows from the compressor 105 via the compressor discharge pipe 109 to the common gas discharge pipe header 104. Condensate from the integral inlet separator 101 is drained through the integral inlet separator drain pipe 112 to the common liquid drain pipe header 103. An inlet ESD (emergency shutdown) automated valve 113 may be installed at the inlet to the common gas inlet pipe header 102. An optional inlet blowdown automated valve 114 may be installed downstream of the inlet ESD automated valve 113 to vent gas from the inlet piping (or "de-gas" the skid) during an emergency.

The condensate level inside the integral inlet separator 101 is measured by a level gauge 115 connected to the integral inlet separator 101 at an upper level gauge connection 116 and at a lower level gauge connection 117. The integral inlet separator level controller 118 is installed with the level gauge 115 and is used to control an automated drain valve 119 located on the integral inlet separator drain pipe 112. When a pre-set maximum liquid level is detected in the integral inlet separator 101, the level controller 118 will open the automated drain valve 119 until the liquid level decreases. The integral inlet separator level controller 118 can be either a pneumatic controller or electronic controller. The integral inlet separator drain pipe 112 is connected to the integral inlet separator 101 at a primary liquid drain connection 120 and preferably to a secondary liquid drain connection 121 and the integral inlet separator drain pipe 112 directs liquids drained from the integral inlet separator 101 to the common liquid drain pipe header 103.

Gas leaves the skid through the common gas discharge pipe header 104. This pipe is designed to handle the gas flow of one or more like skids connected in series. An optional discharge ESD (emergency shutdown) automated valve 122 may be installed at the discharge of this pipe. An additional optional discharge blowdown automated valve 123 may be installed upstream of the discharge ESD automated valve 122 to vent gas from the discharge piping during an emergency.

The slug catcher skid assembly 100 includes an inlet isolation valve 124 on the gas inlet pipe 110 which is used to isolate the individual slug catcher skid 100 systems from other facility gas flow that may be going through the common gas inlet pipe header 102. Since each slug catcher skid assembly 100 is designed to handle the functionality of a single compressor, this same inlet isolation valve 124 can be used whenever it is necessary to isolate the packaged compressor 105 for any maintenance needs.

There is also an optional pressurizing pipe 125 located at the inlet isolation valve 124 on the gas inlet pipe 110. This optional pressuring system is designed to use a small diameter valve 126 and pressurizing pipe 125 to slowly pressurize the downstream systems. Small diameter valve 126 is preferably a two inch or smaller diameter valve. This is required especially with higher pressure inlet conditions when the system goes through commissioning (initial pack and purge gas loading operations), or whenever the system has been de-gassed for maintenance/repairs and needs to be re-pressurized. In systems with higher inlet pressures, opening a larger diameter valve with high differential pressure is difficult. This can create wear on the valve, and the sudden high pressure gas flow through a larger valve opening can damage downstream equipment. The larger diameter valves in these systems are typically six inches in diameter or larger.

Figure 2:
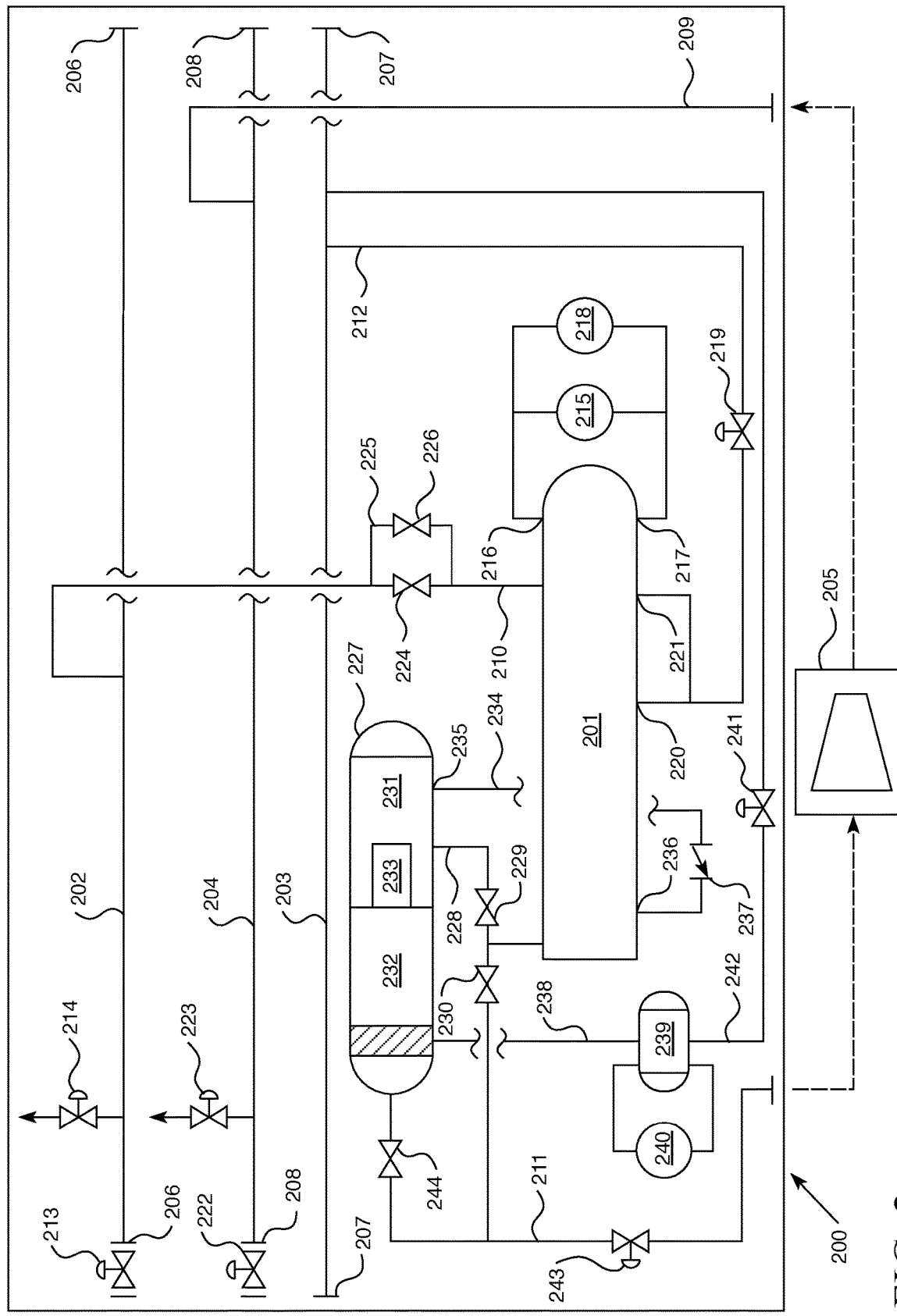
FIG. 2 is a schematic view depicting a second embodiment of the slug catcher skid.

Another embodiment of the slug catcher skid utilizes an inlet filter separator to further enhance separation of gas from condensate. As shown in FIG. 2, the slug catcher skid 200 is comprised of an integral inlet separator 201 (slug catcher), an inlet filter separator 227, a gas flow pipe 228, a common gas inlet pipe header 202, a common liquid drain pipe header 203 and a common gas discharge pipe header 204. An individual slug catcher skid 200 matches up with one compressor 205 in a multi-compressor facility. As each individual slug catcher skid 200 also has a common gas inlet pipe header 202 with flanged connections 206, a common liquid drain pipe header 203 with flanged connections 207, and a common gas discharge pipe header 204 with flanged connections 208; these pipes function as the compressor facility's inlet pipe, liquid drain pipe, and discharge pipe, respectively, as the individual slug catcher skids 200 are connected in a series to one another. On each individual slug catcher skid 200, the integral inlet separator 201 (slug catcher), which is sized according to the specification of its matched compressor 205, separates the gas from the liquid comprising a well flow entering in through the common gas inlet pipe header 202, wherein the gas, which flows up into the gas flow pipe 228 is then further separated from the liquid condensate and airborne particulates in inlet filter separator 227.

The pathway of the well flow in slug catcher skid 200 is outlined as follows. All well flow to the slug catcher individual slug catcher skid 200 enters through a common gas inlet pipe header 202 and the well flow proceeds through the gas inlet pipe 210 to the integral inlet separator 201, where the gas is separated from the liquid of the well flow. The separated gas then flows from the integral inlet separator 201 directly into the inlet filter separator 227 via gas flow pipe 228. In the inlet filter separator 227, gas is further separated from the liquid condensate and airborne particulates. The inlet filter separator 227 is installed in a horizontal orientation at a physical elevation above the integral inlet separator 201. Gas flows out of the inlet filter separator 227 through the compressor inlet pipe 211 to the compressor 205. Compressor discharge gas flows from the compressor 205 via the compressor discharge pipe 209 to the common gas discharge pipe header 204.

The gas flow pipe 228 connects the integral inlet separator 201 to the inlet filter separator 227 with an inlet filter separator inlet isolation valve 229 and a generic bypass valve 230 used for maintenance needs. Inlet filter separator 227 is comprised of two stages, the first stage of the inlet filter separator 231 which uses removable generic filter element(s) which separates aerosol liquids and solid particulates and the second stage of the inlet filter separator vessel 232 which uses additional internal vessel elements to further eliminate any carryover solid particulates and aerosol liquids. Having the inlet filter separator 227 installed at a physical elevation above the integral inlet separator 201 allows the liquids separated in the first stage of the inlet filter separator 231 to gravity drain back to the integral inlet separator 201. The generic filter element 233 is located within the first stage of the inlet filter separator 231. A gravity drain pipe 234 is connected on an upper side to the gravity drain outlet connection 235 on first stage of the inlet filter separator 231 and on a lower side to the gravity drain inlet connection 236 on the integral inlet separator 201. Any liquids that condense out in the first stage of the inlet filter separator 231 are gravity drained back to the integral inlet separator 201 using this design. This is done by using the hydraulic head pressure of any liquids in the gravity drain pipe 234 to overcome the small pressure drop from gas flow through the piping from the integral inlet separator 201 to the first stage of the inlet filter separator 231, and the opening pressure of the generic backflow preventer (check valve) 237 installed in the gravity drain pipe 234. The check valve 237 prevents gas from the gravity drain connection 236 on the integral inlet separator 201 from trying to backflow up into the gravity drain pipe 234. A gravity drain pipe design is not found in traditional inlet filter separator installations. The gravity drain pipe design is a free draining feature which eliminates the complicated automated drain valve systems typically seen on traditional inlet filter separator drain installations. The second stage of the inlet filter separator vessel 232 has a second stage drain pipe 238 that is routed to an external sump 239 to gather any condensate. This external sump 239 has a level controller 240 that controls an external sump automated drain valve 241 located on an external sump drain 242 which connects external sump 239 to common liquid drain pipe header 203. When a pre-set maximum liquid level is detected in the external sump 239, the level controller 240 will open the automated drain valve 241 until the liquid level decreases.

The integral inlet separator 201 serves as a sump for the inlet filter separator 227 with regards to the first stage. Gas leaks and emissions from normal drain valve operation and especially from malfunctioning automated drain valves (stuck open) are eliminated since any gas leakage from gas entrained in the draining liquids through the gravity drain pipe 234 system simply rises back into the gas flow pipe 228 from the integral inlet separator 201. Downstream of the inlet filter separator 227 is the inlet filter discharge isolation valve 244 which is used for maintenance needs, and an optional skid-mounted compressor inlet suction control valve 243. The optional compressor inlet suction control valve 243 is sized for the specific needs of whatever type of compressor 205 is installed with the slug catcher skid assembly 200. The compressor inlet suction control valve 243 functions to maintain a target compressor suction pressure to the compressor 205 when pressure in the integral inlet separator 201 varies for any number of reasons.

When multiple skids are installed in series, the inlet flow continues down all the connected common gas inlet pipe headers 202. An inlet ESD (emergency shutdown) automated valve 213 may be installed at the inlet to the common gas inlet pipe header 202. An optional inlet blowdown automated valve 214 may be installed downstream of the inlet ESD automated valve 213 to vent gas from the inlet piping (or "de-gas" the skid) during an emergency.

Condensate from the integral inlet separator 201 is drained through the integral inlet separator drain pipe 212 to the common liquid drain pipe header 203. The condensate level inside the integral inlet separator 201 is measured by a level gauge 215 connected to the integral inlet separator 201 at an upper level gauge connection 216 and at a lower level gauge connection 217. The integral inlet separator level controller 218 is installed with the level gauge 215 and is used to control an automated drain valve 219 located on the integral inlet separator drain pipe 212. When a pre-set maximum liquid level is detected in the integral inlet separator 201, the level controller 218 will open the automated drain valve 219 until the liquid level decreases. The integral inlet separator level controller 218 can be either a pneumatic controller or electronic controller. The integral inlet separator drain pipe 212 is connected to the integral inlet separator 201 at a primary liquid drain connection 220 and preferably to a secondary liquid drain connection 221 and the integral inlet separator drain pipe 212 directs liquids drained from the integral inlet separator 201 to the common liquid drain pipe header 203.

Gas leaves the skid through the common gas discharge pipe header 204. This pipe is designed to handle the gas flow of one or more like skids connected in series. An optional discharge ESD (emergency shutdown) automated valve 222 may be installed at the discharge of this pipe. An additional optional discharge blowdown automated valve 223 may be installed upstream of the discharge ESD automated valve 222 to vent gas from the discharge piping during an emergency.

The slug catcher skid assembly 200 includes an inlet isolation valve 224 on the gas inlet pipe 210 which is used to isolate the individual slug catcher skid 200 systems from other facility gas flow that may be going through the common gas inlet pipe header 202. Since each slug catcher skid assembly 200 is designed to handle the functionality of a single compressor, this same inlet isolation valve 224 can be used whenever it is necessary to isolate the packaged compressor 205 for any maintenance needs.

There is also an optional pressurizing pipe 225 located at the inlet isolation valve 224 on the gas inlet pipe 210. This optional pressuring system is designed to use a small diameter valve 226 and pressurizing pipe 225 to slowly pressurize the downstream systems. Small diameter valve 226 is preferably a two inch or smaller diameter valve. This is required especially with higher pressure inlet conditions when the system goes through commissioning (initial pack and purge gas loading operations), or whenever the system has been de-gassed for maintenance/repairs and needs to be re-pressurized. In systems with higher inlet pressures, opening a larger diameter valve with high differential pressure is difficult. This can create wear on the valve, and the sudden high pressure gas flow through a larger valve opening can damage downstream equipment. The larger diameter valves in these systems are typically six inches in diameter or larger.

Figure 3:
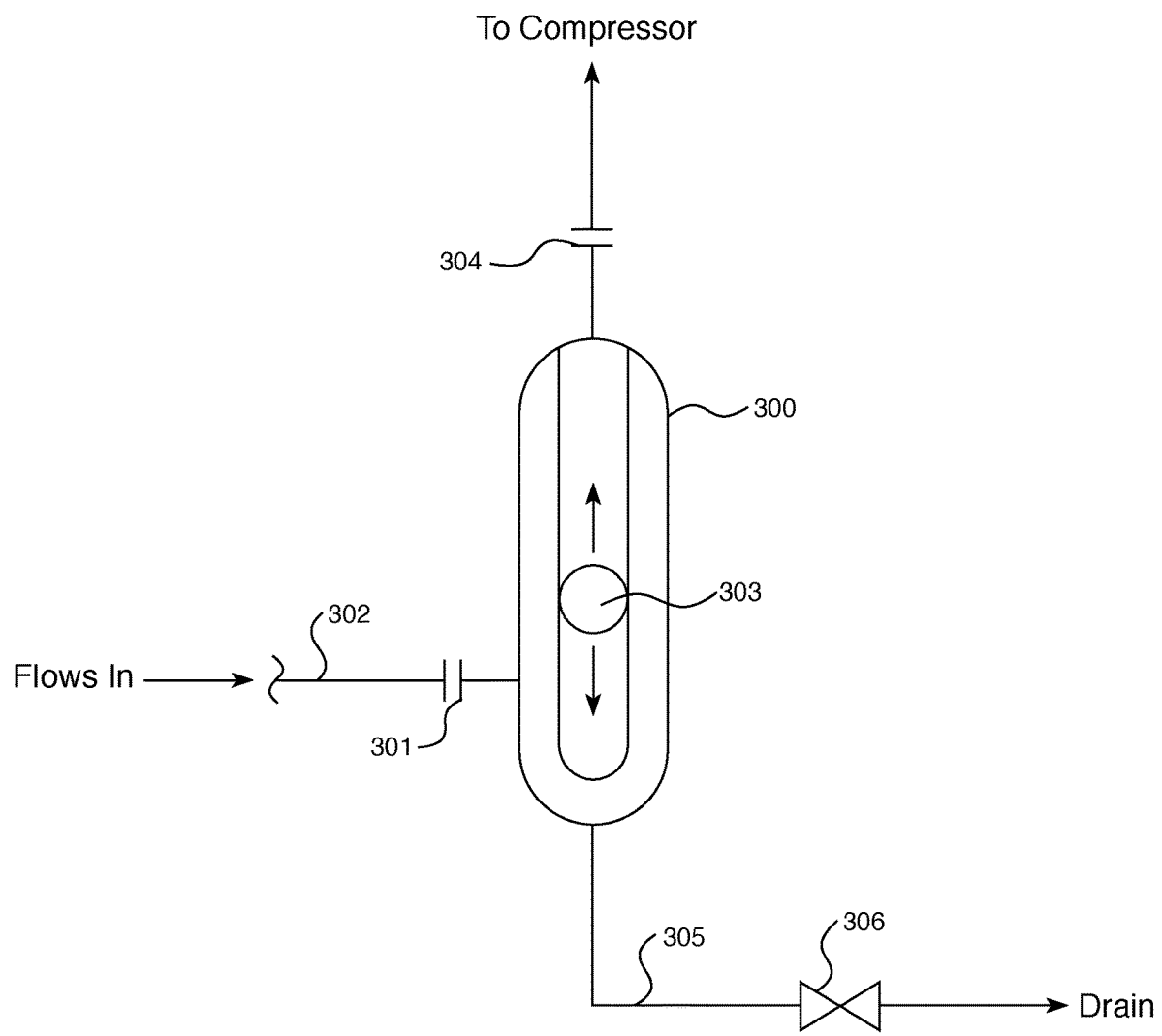
FIG. 3 is a schematic view depicting the PSO system that is used with the various embodiments of the slug catcher skid.
Figure 4:
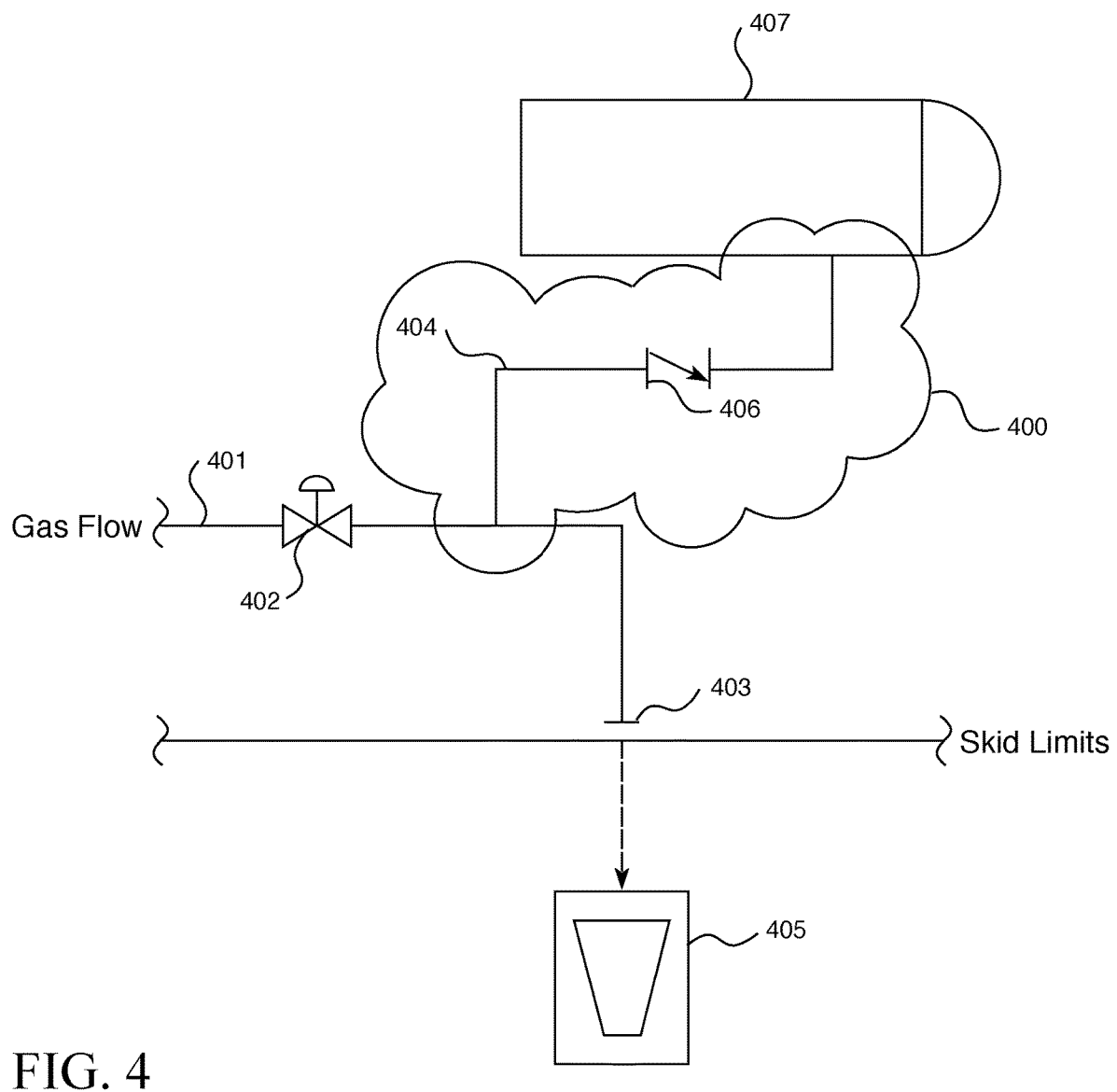
FIG. 4 is a schematic view depicting an equalizing system that is used with the various embodiments of the slug catcher skid.

Optionally embodiments of the slug catcher skid can include an inlet slug catcher liquid PSO system. The PSO system is installed downstream of the integral inlet separator or downstream of the inlet filter separator depending on the design preferred. If a liquid slug entering the facility is too large for the liquid separating volumes of the integral inlet separator on any individual slug catcher skid, then the PSO system will stop the flow of liquid to its matched compressor to prevent damage to the compressor. As shown in FIG. 3, fluid enters the PSO system 300 at the PSO inlet connection 301 from the compressor inlet pipe 302. In some embodiments the compressor inlet pipe 302 emanates from the integral inlet separator; other embodiments the compressor inlet pipe 302 emanates from the inlet filter separator. In normal operation, gas separates from condensate in the integral inlet separator and if present, in the inlet filter separator, and only gas flows through the PSO system 300. When excessive liquid slugs enter an individual slug catcher skid, condensate may pass through the integral inlet separator and if present, the inlet filter separator to the PSO system 300. When condensate enters the PSO system 300 it influences a mechanical float 303 inside the PSO system 300 to rise. When the condensate level rises to a maximum rise point, the mechanical float 303 will rise to plug the PSO discharge connection 304 isolating it from the compressor (not shown) and therefore stopping all flow to the compressor. When flow to the compressor is isolated; the liquid condensate level inside the PSO system 300 is lowered through the PSO system drain pipe 305 via the PSO drain valve 306 and goes to the common liquid drain pipe header (not shown).

Optionally embodiments of the slug catcher skid can include an equalizing system 400. During compression, gas flows from the pre-compressor equipment through the compressor inlet pipe 401 to an optional compressor inlet suction control valve 402, and out through the skid to compressor connection 403. A piping connection located immediately downstream of the compressor inlet suction control valve 402 is for an optional pressure equalizing pipe 404 which is designed to automatically lower the equalized, or settle out, pressure of a compressor that is stopped for any reason. When compressor 405 is suddenly stopped it contains unbalanced pressure in the inlet and discharge portions of the packaged compressor 405 machinery and piping. These unbalanced pressures need to be equalized and reduced back to the target inlet pressure to the packaged compressor 405 prior to re-starting the machinery. Piping and valve systems typically supplied on the packaged compressor 405 are designed to "equalize" the overall trapped gas stuck in the machine by opening a conduit between the high and low pressure parts of the system. This "equalized", or "settle-out", pressure is generally too high for the starter provided with the packaged compressor 405 to start the machinery. A typical method used to reduce this equalized pressure is to "blow down" the trapped compressor gases to an atmospheric vent or flare system prior to re-starting the unit. The pressure equalizing pipe 404 installed on the slug catcher skid assembly with an equalizing system 400 allows the higher "settle out" pressure gas to automatically recycle back to the integral inlet separator 407 until the pressure is lowered back to the integral inlet separator 407 pressure. An equalizing check valve 406 in the pressure equalizing pipe 404 prevents flow from the compressor inlet pipe 401 downstream of the compressor inlet suction control valve 402 until pressure is "equalized" on the packaged compressor 405. Once the packaged compressor 405 is back to the inlet suction pressure, the unit may be re-started without venting or burning any gas.

The slug catcher skid of the claimed invention reduces the number of valves commonly found in compressor facilities. Reducing the number of valves in the facility is an improvement because it reduces the number of permitted leak points (each valve connection) and it reduces the cost and time for annual leak monitoring for emissions testing. This design minimizes the length of piping systems that may need to be de-gassed for intermittent maintenance needs (as compared to traditional installations); thereby also reducing the environmental impact from the facility operations. This design reduces the size of all facility equipment to that required by each individual compressor. The valves required for isolation and maintenance for all site equipment in this design are smaller than those used with traditional facility designs where equipment and valves are sized for the total combined facility capacity (including future capacity in most cases) and are based on common gas inlet and discharge pipe sizes. Smaller diameter valves are easier for operators to handle, and maintenance/replacement costs are much smaller. This new design simplifies operations and reduces the number of large valves needed at the facility.

The slug skids of the claimed invention can be utilized with or without any post compressor functional equipment as part of the skid platform. If present on the skid platform, the slug catcher skid of the claimed invention can be used with any configuration of post-compressor functional equipment. Such post-compressor can include, but are not limited to, discharge gas oil separation vessels and glycol separation vessels.

The foregoing description merely illustrates the invention is not intended to be limiting. It will be apparent to those skilled in the art that various modifications can be made without departing from the inventive concept. Accordingly, it is not intended that the invention be limited except by the appended claims:

The invention claimed is:

1. A slug catcher skid comprising:
   a common gas inlet pipe header, a gas inlet pipe, integral inlet separator, a gas flow pipe, an inlet filter separator, a compressor inlet pipe, a compressor discharge pipe, a common gas discharge pipe header, and a common liquid drain pipe header;
   wherein the common gas inlet pipe header is comprised of flanged connections;
   wherein the gas flow pipe includes a generic isolation valve and a generic bypass valve;
   wherein the gas inlet pipe includes an inlet isolation valve;
   wherein the integral inlet separator is sized for gas flow requirements to an individual compressor and is further comprised of an integral inlet separator drain pipe connecting to the integral inlet separator via a primary liquid drain connection, the integral inlet separator drain pipe connecting the integral inlet separator to the common liquid drain pipe header;
   wherein the integral inlet separator is also comprised of a gravity drain inlet connection,
   wherein the inlet filter separator is comprised of two stages, a first stage of the inlet filter separator and a second stage of the inlet filter separator; and wherein inlet filter separator is further comprised of a gravity drain pipe connected to the first stage of the inlet filter separator via a gravity drain outlet connection; whereby the gravity drain pipe further includes a check valve; whereby condensate from the first stage of the inlet filter separator gravity drains out of the gravity drain inlet connection back to the integral inlet separator via the gravity drain pipe; and wherein the second stage of the inlet filter separator has a second stage drain pipe that is routed to an external sump; and wherein the external sump has a level controller that controls an external sump automated drain valve located on an external sump drain which connects the external sump to the common liquid drain pipe header
   wherein the common gas discharge pipe header is comprised of flanged connections;
   wherein the common liquid drain pipe header is comprised of flanged connections;
   whereby a fluid comprised of gas and condensate coming from a well enters the skid through the common gas inlet pipe header and then travels sequentially through the gas inlet pipe into the integral inlet separator whereby the gas is separated from the condensate, the gas then travels up through the gas flow pipe into the inlet filter separator, gas exits the inlet filter separator via the compressor inlet pipe entering the individual compressor and compressed gas is formed, the compressed gas then travels through the compressor discharge pipe to the common gas discharge pipe header and eventually exiting the skid.

2. The slug catcher skid of claim 1, wherein a level gauge measures the condensate level within the integral inlet separator, wherein the integral inlet separator is connected to the level gauge via an upper level gauge connection and a lower level gauge connection; wherein the level gauge is further comprised of an integral inlet separator level controller, wherein the integral inlet separator drain pipe is further comprised of an automated drain valve, whereby when the condensate level rises up to a maximum liquid level setpoint between the upper gauge connection and lower gauge connection, the integral inlet separator level controller opens the automated drain valve allowing the condensate to drain and when the condensate level inside drains down to a minimum liquid level setpoint between the upper gauge connection and lower gauge connections, the integral inlet separator level controller closes the automated drain valve.

3. The slug catcher skid claim 1, whereby the slug catcher skid is capable of connecting to other identical slug catcher skids in series via the flanged connections of the common gas inlet pipe header, the flanged connections of the common gas discharge pipe header, and the flanged connections of common liquid drain pipe header; each connecting to the flanged connections of their corresponding part on the other slug catcher skids respectively.

4. The slug catcher skid of claim 1, further comprised of a PSO System, whereby the PSO system is located between the compressor inlet pipe and the compressor; whereby the PSO system is comprised of an interior mechanical float, a PSO system drain pipe, a PSO drain valve, and a PSO discharge connection that connects the PSO system to the compressor, and whereby condensate enters the PSO system via the compressor inlet pipe causing the interior mechanical float to rise, at a maximum rise point the mechanical float plugs the PSO discharge connection thereby isolating the compressor from the condensate, and whereby the condensate drains through the PSO system drain pipe via the PSO drain valve into the common liquid drain pipe header.

5. The slug catcher skid of claim 1 whereby an inlet ESD automated valve is installed on the common gas inlet pipe header.

6. The slug catcher skid of claim 5 whereby a blowdown automated valve is installed downstream of the inlet ESD automated valve to vent gas from the common gas inlet pipe header.

7. The slug catcher skid of claim 1, whereby a discharge ESD automated valve is installed on the common gas discharge pipe header.

8. The slug catcher skid of claim 7, whereby a blowdown automated valve is installed upstream of the discharge ESD automated valve to vent gas from the common gas discharge pipe header.

9. The slug catcher skid of claim 1, further comprising a pressurizing pipe with a small diameter valve located at the inlet isolation valve on the gas inlet pipe.

10. The slug catcher skid of claim 1, further comprising a compressor inlet suction control valve, a pressure equalizing pipe, and an equalizing check valve, whereby the equalizing check valve in the pressure equalizing pipe prevents flow from the compressor inlet pipe downstream of the compressor inlet suction control valve until pressure is "equalized" on the compressor.

11. The slug catcher skid of claim 1, whereby the integral inlet separator drain pipe is further comprised of a secondary liquid connection that connects to the integral inlet separator.

\* \* \* \* \*